United States Patent [19]

Kumon et al.

[11] Patent Number: 4,890,212
[45] Date of Patent: Dec. 26, 1989

[54] ELECTRIC APPARATUS HAVING A START-UP CONTROL FUNCTION

[75] Inventors: Toshihiko Kumon; Nobuaki Nishioka, both of Toyokawa, Japan

[73] Assignee: Minolta Camera Kabushiki Kaisha, Osaka, Japan

[21] Appl. No.: 109,092

[22] Filed: Oct. 15, 1987

[30] Foreign Application Priority Data

Oct. 23, 1986 [JP] Japan ................................ 61-252184

[51] Int. Cl.⁴ .............................................. H02J 3/14
[52] U.S. Cl. ..................................... 363/49; 323/901; 355/309; 307/29; 307/38
[58] Field of Search ......................... 363/49; 323/901; 307/29–36, 38–41, 125, 126, 130, 131; 355/208, 309

[56] References Cited

U.S. PATENT DOCUMENTS

| | | | |
|---|---|---|---|
| 4,113,375 | 9/1978 | Murata et al. | 355/208 X |
| 4,292,543 | 9/1981 | Reed Sr. | 307/126 X |
| 4,593,349 | 6/1986 | Chase et al. | 307/39 X |
| 4,639,609 | 1/1987 | Floyd et al. | 307/38 X |
| 4,657,376 | 4/1987 | Ide | 355/309 |
| 4,674,031 | 6/1987 | Siska Jr. | 307/41 X |
| 4,736,116 | 4/1988 | Pavlak Jr. et al. | 307/38 X |

FOREIGN PATENT DOCUMENTS 2818067 8/1979 Fed. Rep. of Germany.

Primary Examiner—Patrick R. Salce
Assistant Examiner—Emanuel Todd Voeltz
Attorney, Agent, or Firm—Price, Gess & Ubell

[57] ABSTRACT

An electric apparatus for carrying out start-up control of a plurality of devices requiring start-up electric currents exceeding an amount of current required at ordinary states thereof. The apparatus has a power source, a signal generating circuit for generating a stable state signal when one or the plurality of the devices enter a stable state after start-up thereof and a control circuit for causing a next device to start in response to the output of the stable state signal to the previously started device or devices. One example of the signal generating circuit includes an electric current measuring circuit and judges that the device is at a stable state thereof when the electric current supplied to the device becomes lower than a predetermined value. The above construction temporarily prevents maximum start-up currents of the devices from being supplied from the power source to the respective devices and consequently reduces the electric load on the power source.

9 Claims, 4 Drawing Sheets

ELECTRIC APPARATUS HAVING A START-UP CONTROL FUNCTION

BACKGROUND OF THE INVENTION (1) Field of the Invention

The present invention relates to an electric apparatus having a start-up control function for starting a plurality of devices such as a motor or a lamp requiring an initial start-up electric current exceeding an amount of electric current required at ordinary states thereof, the apparatus being used for start-up control e.g. of an electronic copier or a laser printer.

(2) Description of the Prior Art

For an electronic copier, a laser printer or the like, a plurality of electric devices such as a motor or a lamp are used and the devices are simultaneously started up at the power-on of the copier or the printer. However, these devices require a start-up electric current (transient current) exceeding an amount of electric current required at ordinary operational states thereof, thus, it is necessary for a power supply device to have an electrical capacity large enough for supplying the start-up current. As a result, such a power supply device tends to be costly and heavy and also short in life expectancy because of the excessive electric load applied thereto, and this further results in increase in cost and troubles for the operation of the copier and the printer.

SUMMARY OF THE INVENTION

The object of the present invention is to provide an electric apparatus having a start-up control function, whereby the start-up currents of the motor, the lamp and so on are prevented from being required simultaneously from the power supply device and as the result it becomes possible to make the capacity of the power supply device smaller, the power supply device being protected from the requirements of an excessive load.

In order to accomplish the above object, an electric apparatus related to the present invention having a plurality of devices requiring a start-up electric current exceeding an amount of current required at ordinary operational states thereof comprises a power source, power supplying means provided for each of the devices for supplying electric power from the power source to the respective devices, signal generating means for generating a stable state signal when one or the plurality of the devices enter a stable state after start-up thereof and control means for controlling the power supply means to start a next device in response to the output of the stable state signal of the previously started device or devices.

According to one preferred embodiment of the present invention, the signal generating means includes a circuit for measuring electric current supplied to the device(s), the means generating the stable state signal when the measured start-up current of the device(s) becomes lower than a predetermined value.

Advantages of the above-described characterizing features of the present invention will be described next. Since such devices as the motor or the lamp respectively requiring a large amount of start-up current are started at different timings, the power supply device does not have to simultaneously supply the large amount of start-up currents to the devices. As a result, the maximum value of the transient current is greatly reduced, whereby the power supply device may be designed to have a small capacity and at the same time may be protected from an excessive electric load.

Other objects and advantages of the present invention will become more apparent from the following description of the preferred embodiments with reference to the accompanying drawings.

DESCRIPTION OF THE PREFERRED EMBODIMENTS

Figure 1:
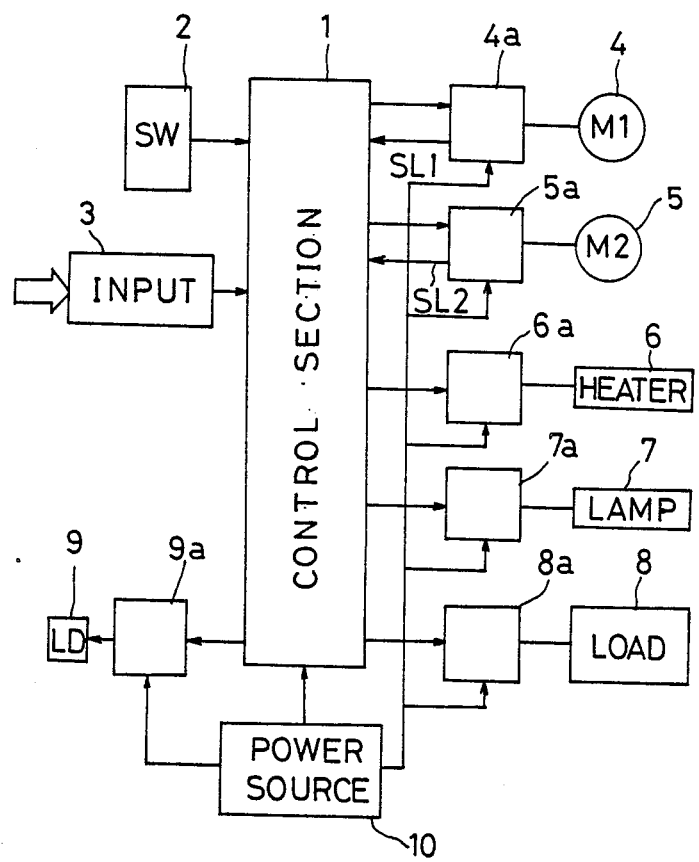
FIG. 1 is a block diagram schematically showing a construction of a laser printer incorporating an electric apparatus related to the present invention.

FIG. 1 is a block diagram schematically showing a construction of a laser printer incorporating an electric apparatus related to the present invention. In the same figure, there are shown a control section 1 for controlling the whole laser printer, an input unit 3 constituted by various kinds of sensors and switches provided inside the printer or on a control panel thereof, an input section for receiving from outside image data to be printed and various control data, a main motor 4 for rotatably driving various rollers and a photoreceptor drum inside the laser printer, a polygon mirror motor 5 for driving a polygon mirror, a heater 6 attached inside a heating roller for carrying out an image fixing operation, an eraser lamp 7, a load unit 8 constituted by chargers, clutches for transmitting rotational output of the main motor 4 to the various rollers at proper timings or the like, driving sections 4a, 5a, 6a, 7a, 8a for respectively driving the main motor 4, the polygon mirror motor 5, the heater 6, the eraser lamp 7 and the load unit 8, and a power supply device 10 for supplying electric power to the driving sections 4a, 5a, 6a, 7a, 8a.

The main motor 4 and the polygon mirror motor 5 comprise DC motors, to which encoders are connected such that these motors 4, 5 are rotated at constant speeds set by the respective driving sections 4a, 5a. It takes time for the rotational speed of these motors 4, 5 to reach the respective speeds set by the driving sections, and especially in the case of the polygon mirror motor 5, the above operations takes a few seconds since this motor 5 is set to a high rotational speed. When the rotational speeds of the motors reach the target speeds, the respective driving sections 4a, 5a generate lock signals SL1, SL2. These devices, the main motor 4, the polygon mirror motor 5, the heater 6, the eraser lamp 7 and so on respectively require a start-up current exceeding the ordinary operational current thereof, and the power supply device 10 is designed for supplying various voltages for these devices.

Figure 2:
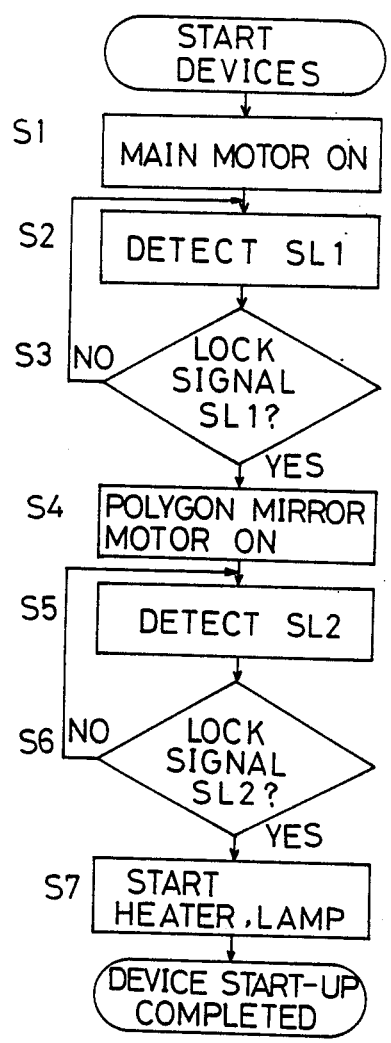
FIG. 2 is a flow chart illustrating major functions executed by a control section of the apparatus shown in FIG. 1.

FIG. 2 is a flow chart illustrating control operations executed by the control section 1 for starting up the above devices. Referring to this chart, with a power-on of the laser printer, the main motor 4 is started at step S1. At step S2, the control section 1 takes the lock signal SL1 of the main motor 4 thereinto. Then, at step S3, presence or absence of this lock signal SL1 is judged. In the case of the absence, the process goes back to step S2. On the other hand, in the case of the presence, the process goes on to step S4 to start the polygon mirror motor 5. At step S5, the control section takes the lock signal SL2 of the motor 5 therein. Then, at step S6, presence or absence of this lock signal SL2 is judged. In the case of the absence, the process goes back to step S5. On the other hand, in the case of the presence, the process goes on to step S7 to start the heater 6 and the eraser lamp 7.

Figure 3:
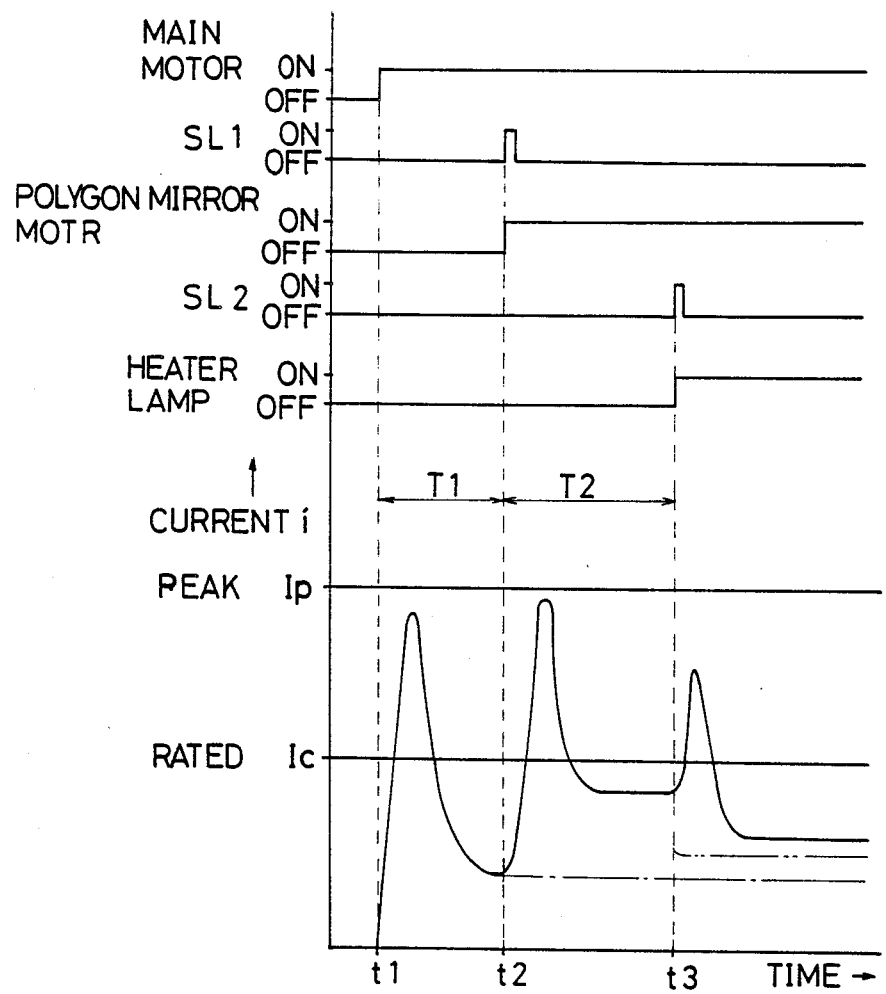
FIG. 3 is a timing chart showing start-up timings and electric characteristics of respective devices.

FIG. 3 is a timing chart showing start-up timings and electric characteristics of the respective devices. In the same chart, a reference mark Ip denotes a peak value of allowable current of the power supply device 10 and a mark Ic denotes a rated current value of the same. Firstly, the main motor 4 is started at a timing t1, and then at a timing t2 after a time period T1 for stabilizing the rotation of the motor 4, the polygon mirror motor 5 is started. Thereafter, at a timing t3 after a time period T2 for stabilizing the rotation of this motor 5, the heater 6 and the eraser lamp 7 are started. After the lock signal SL1 is generated upon the stabilization of the rotation, the current value supplied to the main motor 4 is maintained as indicated by an alternate long and short dash line. In the case of the polygon mirror motor 5, the electric current value is significantly reduced when the lock signal SL2 is output, and then, as indicated by an alternate long and two short dashes line, the reduced current value is maintained thereafter. As described above, the main motor 4, the polygon mirror motor 5, the heater 6 and the eraser lamp 7 are started up at the different timings. Consequently, the power supply device 10 does not have to supply large amount of start-up currents at one time for the above devices and its maximum total start-up current value becomes small, whereby the power supply device 10 may be of a small capacity type having its low peak value of Ip. Therefore, the power supply device 10 may be reduced in cost and weight and at the same time since the device 10 is protected from an excessive load, the deterioration and troubles of the device 10 may be advantageously reduced.

In the above-described embodiment, the lock signals SL1 and SL2 generated at the timings when the rotational speeds of the main motor 4 and the polygon mirror motor 5 have reached the set values are utilized as the stable state signals indicating that the motors 4, 5 have reached stable states thereof. In place of these signals, it is also possible by measuring the currents of the respective motors 4, 5 or all the total currents to utilize signals generated when the start-up currents have become lower than the peak value by a predetermined value. Furthermore, it is also possible by using a timer to make an arrangement that the stable state signals are generated after a predetermined time period measured after a start of the timer. Or, the stable state signals generated by a combination of the above methods may be utilized as well.

Figure 5:
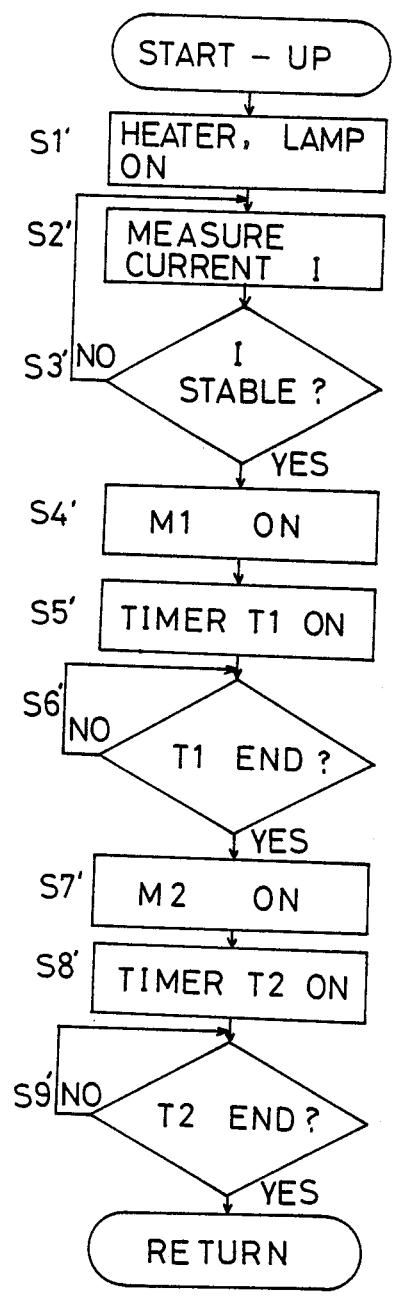
FIG. 5 is a flow chart illustrating major functions executed by a control section of the apparatus shown in FIG. 4.
Figure 4:
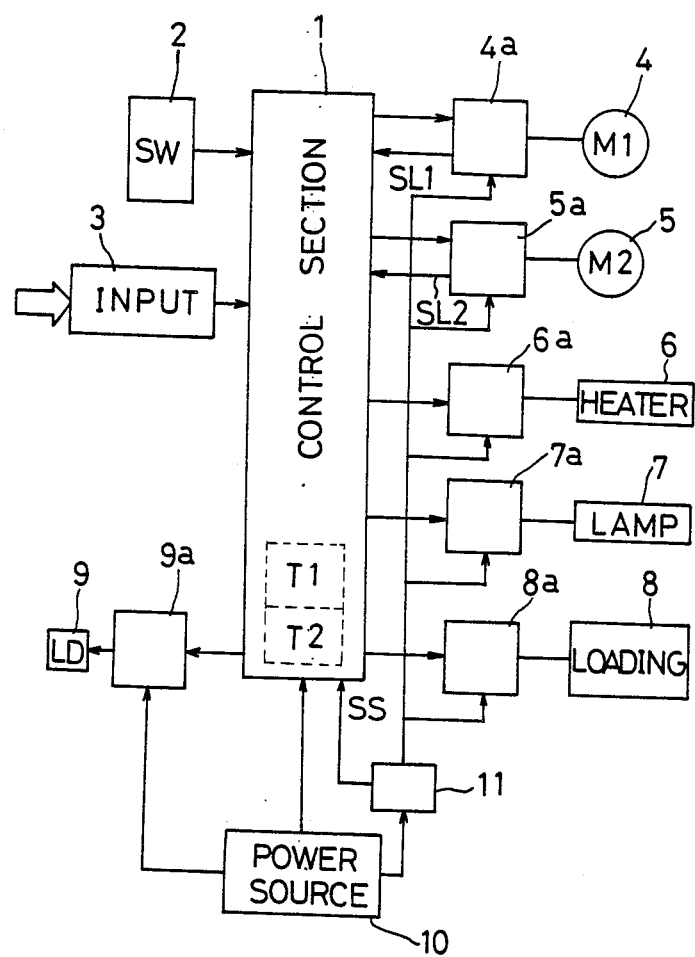
FIG. 4 is a block diagram showing another preferred embodiment different from that shown in FIG. 1.

FIGS. 4 and 5 show a second preferred embodiment of the present invention. In this embodiment, firstly at step S1', the heater 6 and the eraser lamp 7 are started. At step S2', the start-up currents of these devices are measured by a current measuring circuit 11 disposed between the power supply device 10 and the driving sections 4a, 5a, 6a, 7a, 8a of the respective devices. At step S3', if it is judged that the start-up currents to be supplied to the heater 6 and the lamp 7 have been reduced lower than the peak value down to a predetermined value, the current measuring circuit 11 outputs a stable state signal SS to the control section 1. Having received this signal SS, the control section 1 drives a main motor M1 at step S4' and starts a timer T1 at step S5'. This timer T1 is disposed inside the control section 1 and in which a predetermined time period for stabilizing the rotation of the main motor M1 after the start-up of the same is set. With a timing-up of this timer T1 at step S6', a polygon mirror motor M2 is driven at step S7' and a timer T2 having the same construction as the timer T1 is started at step S8'. Thereafter, with a timing-up of this timer T2 at step S9', the control section 1 starts a subsequent operational block.

In this second embodiment, at steps S1' through S3', the total electric currents to be supplied to all the devices are measured and the stable state signals are generated with connection to the measured current values. In place of this, such an arrangement is also possible as the stable state signals are generated with connection to the each current amount supplied to the respective devices.

In both of the above-described embodiments, the heater 6 and the eraser lamp 7 are simultaneously started. In place of this arrangement, these devices may be started at different timings, or may be started at the same timing either as the main motor 4 or as the polygon mirror motor 5. Furthermore, it is also possible to firstly start the heater 6 which takes a considerable time for warming-up and then to start the main motor 4 and the polygon mirror motor 5 in order.

We claim:

1. In a recording apparatus having a plurality of electrical devices that enable a recording operation and which require start-up electric currents exceeding an amount of current required at ordinary operational states of those devices, said devices including a motor for providing a rotational movement, the improvement comprising:

a power source;

power supply means provided for each of the devices for supplying electric power from said power source to the respective device;

stable detecting means provided for the motor for detecting rotation of the motor and for generating a stable state signal when it is detected that the rotation of the motor becomes stable after a start-up thereof, and control means for controlling said power supply means to provide electric power to a subsequent device in response to the output of the stable state signal generated from the state detecting means of the previously started motor.

2. The invention set forth in claim 1, wherein said motor is a main motor of the apparatus and said subsequent device is a polygon mirror motor for rotating a polygon mirror, with said main motor being started earlier than said polygon mirror motor.

3. The invention set forth in claim 1, wherein said motor is a main motor of the apparatus and said subsequent device is a heater for fixing a toner image, with said main motor being started earlier than said heater.

4. The invention set forth in claim 1, wherein said stable detecting means includes an encoder connected to said motor.

5. A method of start-up for controlling a laser printer, comprising the steps of:

initially supplying electric power from a power source to a main motor for driving a photoreceptor;

generating a stable state signal when it is detected that the main motor enters a stable state of operation, and supplying electric power from said power source to a polygon mirror motor for rotating a polygon mirror in response to the output of the stable state signal generated.

6. A method of start-up for controlling a recording apparatus, comprising the steps of:

initially supplying electric power from a power source to a main motor for driving a photoreceptor;

generating a stable state signal when it is detected that the main motor enters a stable state of operation, and supplying electric power from said power source to a heater for carrying out an image fixing operation in response to the output of the stable state signal generated.

7. In a laser printer having a plurality of electrical devices that enable the laser printer operation and which require start-up electric currents exceeding an amount of current required at ordinary operational states of those devices, the improvement comprising:

a power source;

power supplying means provided for each of the devices for supplying electric power from said power source to the respective devices, one of said devices is a motor for driving a movable member and another of said devices is a heater for fixing a toner image, with said heater being started by electric power earlier than said motor;

stable detecting means provided, for each of the devices, for detecting the status of each of the devices and for generating a stable state signal when it is detected that the corresponding device enters a stable state after a start-up thereof, the stable state detecting means for the motor detects the rotational speed of the motor and generates a lock signal indicating a constant rotational speed;

measuring means disposed between said power source and said power supply means for measuring a total current amount supplied to the respective devices and for generating a stable state signal when the total current amount is reduced to lower than a predetermined value after one or a plurality of devices has been started up, and control means for controlling said power supply means to provide electric power to a subsequent device in response to the output of the stable state signal generated from the measuring means.

8. In a recording apparatus having a plurality of electrical devices that enable a recording operation and which require start-up electric currents exceeding an amount of current required at ordinary operational states of those devices, the improvement comprising:

a power source;

power supply means provided for each of the devices for supplying electric power from said power source to the respective device, one of said devices is a motor driving a movable member;

stable detecting means provided for each of the devices for detecting the status of each of the devices and for generating a stable state signal when it is detected that the corresponding device enters a stable state after a start-up thereof, the stable state detecting means for the motor detects a rotational speed of the motor and generates a lock signal indicating a constant rotational speed;

means for determining the existence of the lock signal and generating a corresponding signal;

measuring means disposed between said power source and said power supply means for measuring a total current amount supplied to the respective devices and for generating a stable state signal when the total current amount is reduced to lower than a predetermined value after one or a plurality of devices has been started up, and control means for controlling said power supply means to provide electric power to a subsequent device in response to the output of the signal from the determining means.

9. The invention set forth in claim 8, wherein said stable state detecting means includes a circuit for measuring electric currents to be supplied to the respective devices.

* * * * *